Jan. 8, 1929.
C. S. BATDORF
1,698,386
WATER COOLER
Filed March 4, 1927   2 Sheets-Sheet 1
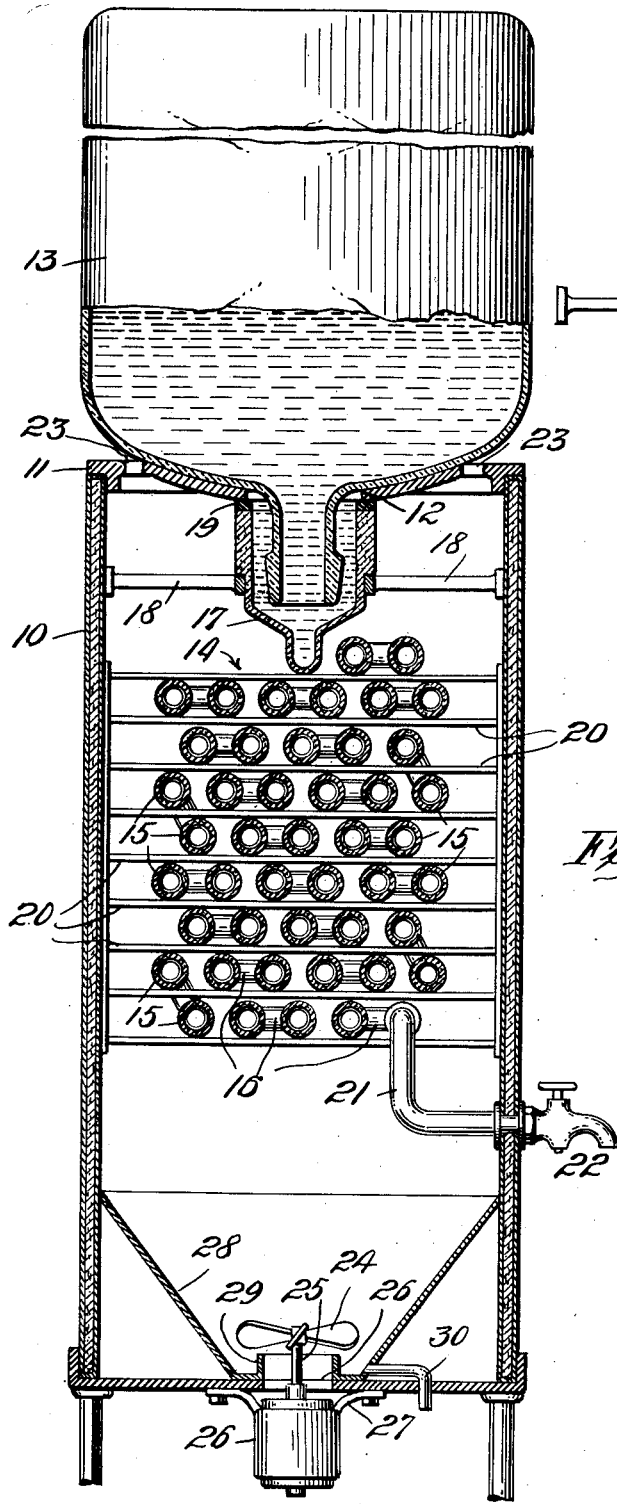
Fig. 1.
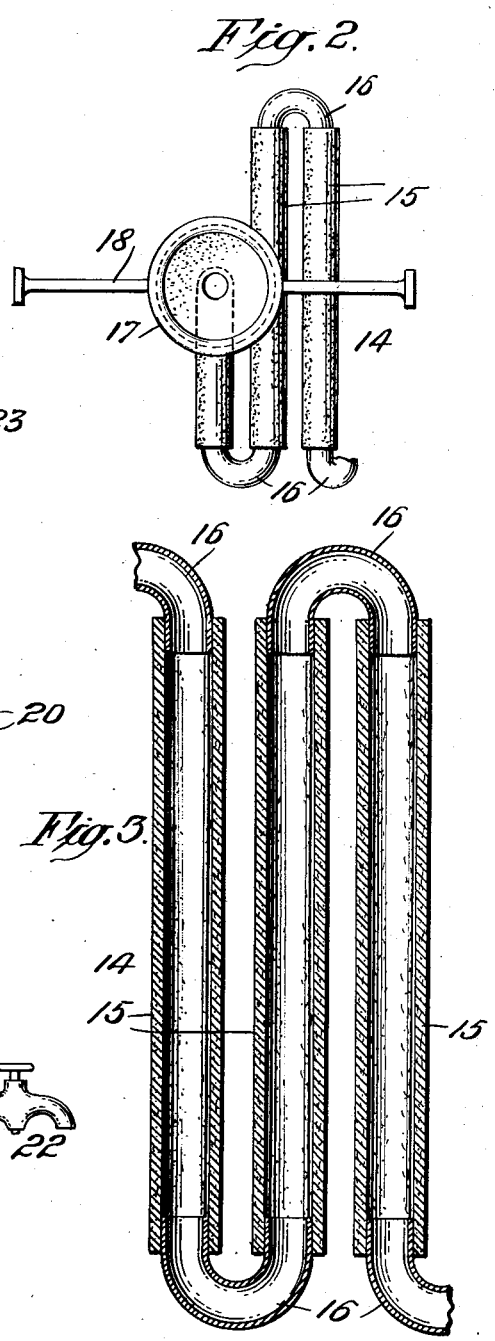
Fig. 2.
Fig. 3.
INVENTOR
Charles S. Batdorf
BY
Geo. S. Whellock
ATTORNEY Jan. 8, 1929. 1,698,386
C. S. BATDORF
WATER COOLER
Filed March 4, 1927 2 Sheets-Sheet 2
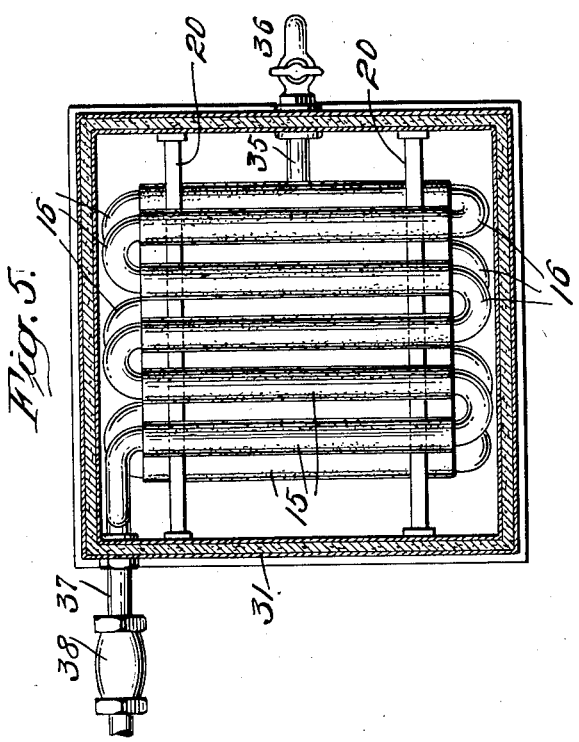
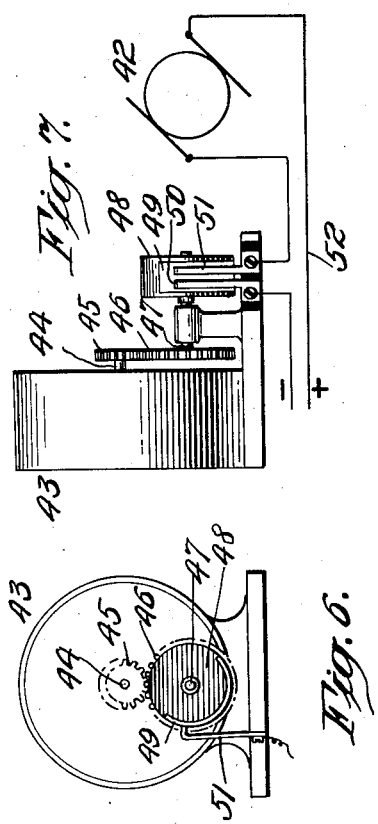
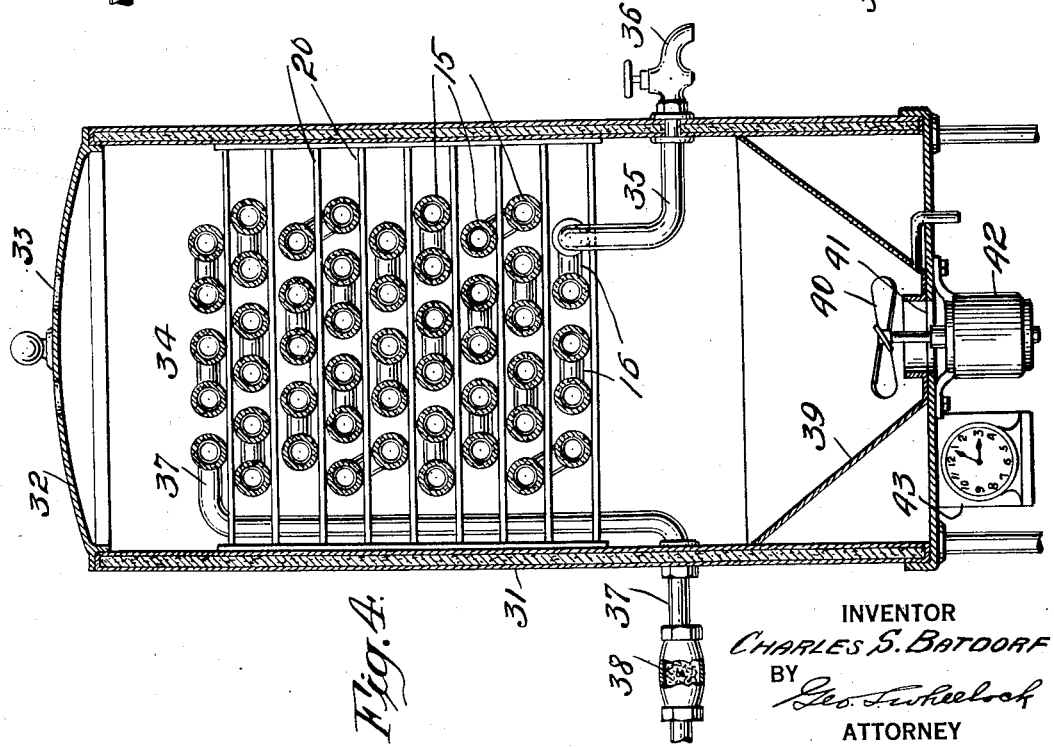
INVENTOR
*Charles S. Batdorf*
BY
*Geo. Wheelock*
ATTORNEY Patented Jan. 8, 1929.

1,698,386

UNITED STATES PATENT OFFICE.

CHARLES S. BATDORF, OF BROOKLYN, NEW YORK.

WATER COOLER.

Application filed March 4, 1927. Serial No. 172,705.

This invention relates to liquid coolers, more especially water coolers, of the class in which the liquid is cooled through the evaporation of moisture outside the container or conduit for the liquid.

An object of the invention is to provide an efficient and economical cooler of the class mentioned wherein the liquid is preferably contained in conducting means, such, for example, as a coil of pipes, and wherein a current of air is artificially created so as to flow around the liquid conducting means, which are of a porous nature, that is, permeable to moisture.

Another object of the invention is to so enclose the liquid conducting means and a fan which may be operated by a motor, so that the forced draft created by the fan will be compelled to circulate around the liquid conducting means transversely of the pipes or conduits which may form the liquid conducting means.

These being among the objects of the present invention, the same consists of certain features of construction and combinations of parts to be hereinafter described and then claimed with reference to the accompanying drawings illustrating preferred embodiments of the invention and in which Fig. 1 is a vertical sectional view, partly in elevation, showing the invention as adapted for an inverted bottle;

Fig. 2 is a plan view of the upper portion of the coil pipes of Fig. 1;

Fig. 3 is a sectional view of some of the turns of the coils;

Fig. 4 is a sectional view of a modification of the cooler;

Fig. 5 is a plan view of the upper part of the enclosure in section;

Fig. 6 is an end view of the timing mechanism; and

Fig. 7 is a side elevation, partly diagrammatic.

Referring to Figs. 1 to 3, inclusive, a casing or enclosure 10 is provided which may be constructed with walls which do not conduct heat to any material extent. Preferably the enclosure 10 stands upright and is provided with a removable cover 11 which has a central aperture 12 adapted to receive the neck of an inverted bottle 13 which may contain water or any other liquid.

Arranged in the enclosure 10 are liquid conducting means preferably in the form of a coil 14 of pipes. Preferably, the coil 14 is made up of a plurality of pipe sections 15 which may be of earthenware or similar sufficiently porous material so that the walls of the sections are permeable, and so that moisture from the liquid will tend to accumulate on the outer surfaces of the pipe sections. These pipe sections 15 extend transversely across the inner chamber of the enclosure 10, and the ends of the adjacent pipe sections are connected by return bends 16, so that a continuous channel is formed throughout the length of the coil of pipes. The upper end of the coil, that is the first pipe section of the coil starts from the inlet mouth member 17, which may also be of porous material. This mouth member may be supported by braces 18 secured to the side walls of the upper portion of the enclosure 10, and it extends upwardly close to the cover 11 and the joint may be packed by a suitable packing 19, so that when the neck of the bottle is inserted through the aperture 12 a seal will be formed between the bottle and the mouth portion 17 to prevent escape of liquid.

The turns of the coil of pipes may be supported by a series of cross braces or supports 20, and the last turn of the coil terminates in a pipe extension 21 that passes through the wall of the enclosure and terminates in a controlled outlet 22, preferably in the form of a water faucet.

A current of air may be permitted or caused to play around the porous pipe section 15 with a view to evaporating moisture on the outer surfaces of the pipe sections, so that the liquid flowing through the coil will be cooled by such enforced evaporation, the air finding outlets through the openings 23 in the cover 11. Preferably the current of air is artificially and positively created, as by means of a rapidly rotated fan 24 located within the lower portion of the enclosure 10, so as to cause a draft of cooling air upwardly through the enclosure and around the separate pipe sections 15, the air flowing in a countercurrent to the flow of liquid toward outlet 22. The shaft 25 of the fan extends through an aperture 26 in the bottom of the enclosure 10, which aperture constitutes the inlet for air. Through the medium of the shaft 25, the fan may be rapidly rotated by means of an electric motor 26 which is independently operated from the flow of liquid and may be supported by a frame 27 attached to the bottom of the enclosure 10. As a matter of fact the motor, and hence the fan, is operated without dependence on the head of the liquid.

It will be understood that air sucked through the inlet aperture 26 by means of the fan 24 will be forced through the enclosure and will pass out at the top openings 23 which are around the liquid bottle 13. This will have a tendency to preliminarily cool the liquid in the bottle. Furthermore, the current of air passes over the moist pipe sections 15 and sufficiently lowers the temperature of the liquid in the coil pipes so that it may be drawn off as a cool liquid through the faucet 22. There is a substantially free air space between the fan and the liquid conducting pipes, so that the flow of air is unobstructed, except by the pipes.

Within the bottom portion of the enclosure there is a drip collector 28 preferably in the form of a funnel, the wide mouth of which is at the top and close to the wall of the enclosure 10, while the lower end of the same converges close to the aperture 26, so that drip from the coil of pipes may be directed towards the fan. A guard flange 29 extends upwardly from the aperture so that with the lower end of the funnel 28 it will form a trough for the accumulated drip of liquid, which may pass off through an outlet 30.

In the modification shown in Figs. 4 and 5, the enclosure 31 is provided with a cover 32 having air outlet openings 33. A coil of pipes 34 preferably arranged and constructed similarly to the coil of pipes 14, is arranged in the enclosure 31 and is provided with an outlet pipe 35 and terminal faucet 36. A supply pipe 37 extends through the enclosure 31 and upwardly therein, its upper end being connected with the first turn of the coil pipes. Said supply pipe 37 may be provided with a filter 38.

Within the bottom portion of the enclosure 31 there are drip collecting means 39 similar to what has been previously described, and there is a fan 40, the shaft of which extends through air inlet aperture 41 and is operated by an electric motor 42.

In case it is not desired to run the fan 40 for an indefinite length of time, means may be provided for stopping the motor. Such means may comprise a clock 43, and one form of clock control is illustrated in Figs. 6 and 7.

The hour mechanism of the clock may, for example, turn a shaft 44 provided with a gear 45 which meshes with a gear 46, which is on a suitably supported shaft 47 which carries a cut-out disk 48. The edge of the disk 48 may be provided with a conducting strip 49 of such length as desired, with a view to automatically cutting off the current of electricity at night and turning it on in the morning. The conducting strip 49 is moved by the clock in contact with a pair of contacts 50, 51 which are connected with the respective sides of the circuit 52 for the motor 42. No further description of the operation of the time controlling means is deemed necessary.

In practice, it may be found desirable to provide an automatic cut-off for the water, at pipe 37. This is because of the fact that the water is there under pressure and one of the pipe sections might break. One way of cutting off would be to provide a valve in pipe 37 which would be automatically closed by the weight of water which had accumulated in a vessel as a result of the break and leakage of water so that the vessel would automatically close such valve.

It is obvious that the invention is susceptible of modification while remaining within the scope of the appended claims.

What I claim as new is:

1. In a liquid cooler, the combination of an enclosure, a plurality of permeable pipes arranged transversely in the same for the flow of a liquid to be cooled and having a controlled outlet, and means for positively generating a flow of air through the enclosure and around the pipes, the enclosure being substantially free from any obstruction to the flow of air to the pipes.

2. In a liquid cooler, the combination of an enclosure, a coil of permeable pipes in the same for the flow of a liquid to be cooled and having a controlled outlet, such coil comprising porous pipe sections extending transversely of the enclosure, and means for generating a flow of air through the enclosure in the direction in which the coil extends as a whole and around the pipes, and in a counter current to the flow of the liquid towards the outlet, the enclosure being substantially free from any obstruction to the flow of air to the pipes.

3. In a liquid cooler, the combination of an enclosure, porous liquid conducting means therein provided with an inlet and a controlled outlet for establishing a flow of liquid in contact with the porous means in directions transversely of the enclosure, and means for positively generating a flow of air through the enclosure and around the liquid conducting means independently of the head of the liquid.

4. In a liquid cooler, the combination of an upright enclosure, porous liquid conducting means therein provided with an inlet for liquid at the upper end and a controlled outlet for liquid at the lower end, such means traversing the enclosure from side to side, and means at the bottom of the enclosure for generating a flow of air upwardly through the enclosure and transversely around the liquid conducting means.

5. In a liquid cooler, the combination of an upright enclosure having an air-outlet opening in its upper portion, a porous liquid conducting coil therein, below said opening, and provided with an inlet and a controlled outlet, said coil filling a comparatively large portion of the enclosure, drip collecting means in the bottom of the enclosure and having an outlet, and means at the lower end of the enclosure for forcing a flow of air upwardly through the enclosure and around the coil.

6. In a liquid cooler, the combination of an upright enclosure having an air outlet opening in its upper portion, a porous liquid conducting coil thereon, below said opening, and provided with an inlet and a controlled outlet, said coil filling a comparatively large portion of the enclosure, a drip collecting funnel in the bottom of the enclosure, having a central aperture, said funnel having an outlet for the collected drip, and a fan disposed relatively to the central aperture for causing a flow of air therethrough, inwardly into the enclosure and around the coil.

7. In a liquid cooler, the combination of an enclosure having upper means for supporting an inverted liquid bottle with its neck extending into the enclosure, porous liquid conducting means in the enclosure, and having an outlet, and an inlet mouth member leading to the liquid conducting means, for operative cooperation with the mouth of the bottle, the enclosure being open for the circulation of air around the liquid conducting means, and the porous structure of the conducting means being relatively close to the mouth and hence close to the bottle.

8. In a liquid cooler, the combination of an enclosure having upper means for supporting an inverted liquid bottle with its neck extending into the enclosure, porous liquid conducting means in the enclosure, and having an outlet, an inlet mouth member leading to the liquid conducting means, for operative cooperation with the mouth of the bottle, and means for positively generating a flow of air upwardly through the enclosure and around the liquid conducting means.

9. In a liquid cooler, the combination of an enclosure having an apertured cover, the cover adapted to support an inverted liquid bottle with its neck extending into the aperture, a porous liquid conducting coil having an outlet, an upwardly extending mouth portion connected with the upper portion of the coil and adapted to receive the mouth of the bottle, and means for generating a flow of air through the enclosure and around the coil, said cover having an air outlet opening, whereby the flowing air is adapted to preliminarily reduce the temperature of the liquid in the bottle.

CHARLES S. BATDORF.